United States Patent
Parsley et al.

(10) Patent No.: US 12,312,895 B2
(45) Date of Patent: May 27, 2025

(54) FLUID ENERGIZED METAL-TO-METAL SEAL WITH RETRIEVAL CAPABILITIES

(71) Applicant: Baker Hughes Oilfield Operations LLC, Houston, TX (US)

(72) Inventors: Ryan Parsley, Houston, TX (US); Keith Adams, Katy, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/865,730

(22) Filed: Jul. 15, 2022

(65) Prior Publication Data

US 2024/0018839 A1    Jan. 18, 2024

(51) Int. Cl.
E21B 33/04 (2006.01)
F16J 15/08 (2006.01)
F16J 15/48 (2006.01)

(52) U.S. Cl.
CPC ........... *E21B 33/04* (2013.01); *F16J 15/0887* (2013.01); *F16J 15/0893* (2013.01); *F16J 15/48* (2013.01); *E21B 2200/01* (2020.05)

(58) Field of Classification Search
CPC .......... E21B 33/02; E21B 33/03; E21B 33/04; E21B 2200/01; F16J 15/0087
See application file for complete search history.

(56) References Cited

U.S. PATENT DOCUMENTS

| | | | |
|---|---|---|---|
| 2,504,025 A | 4/1950 | Humason | |
| 4,561,499 A | 12/1985 | Berner, Jr. | |
| 4,615,544 A | 10/1986 | Baugh | |
| 4,736,799 A | 4/1988 | Ahlstone | |
| 5,044,442 A | 9/1991 | Nobileau | |
| 7,478,673 B2 | 1/2009 | Boyd | |
| 7,934,546 B2 | 5/2011 | McGuire | |
| 8,820,400 B2 | 9/2014 | McGuire | |
| 9,359,849 B2 | 6/2016 | Nguyen | |
| 10,260,307 B2 | 4/2019 | Godfrey | |
| 2013/0105158 A1 | 5/2013 | Saltel | |
| 2014/0060805 A1* | 3/2014 | Campbell | E21B 33/04 166/75.11 |

(Continued)

FOREIGN PATENT DOCUMENTS

| | | |
|---|---|---|
| WO | 2020254543 A1 | 12/2020 |
| WO | 2022129523 A1 | 6/2022 |

OTHER PUBLICATIONS

F. Louden et al., "Development of a Hydraulically Expanded Metal Internal Casing Patch," 2005 SPE/ICoTA Coiled Tubing Conference and Exhibition, The Woodlands, TX, Apr. 12-13, 2005, 4 pages.

(Continued)

*Primary Examiner* — George S Gray
(74) *Attorney, Agent, or Firm* — Baker Hughes Patent Organization

(57) ABSTRACT

An annular hanger seal for sealing a tubing or casing hanger comprising a flow passage, at least one seal chamber, and a metal surface. Pressure can enter the hanger seal through the flow passage causing the at least one seal chamber to expand. Expansion of the at least one seal chamber can cause sealing contact between the metal surface around the at least one seal chamber and the housing, the hanger, or both surfaces. The seal can later be punctured or otherwise depressurized to break sealing contact for removal of the hanger from the annular space.

17 Claims, 8 Drawing Sheets

(56) References Cited

U.S. PATENT DOCUMENTS

2016/0186519 A1* 6/2016 Krejci .................... E21B 33/04
                                                        166/75.11
2019/0309594 A1   10/2019 Rodela et al.
2019/0309598 A1* 10/2019 Cheng .................. E21B 33/128

OTHER PUBLICATIONS

International Search Report and Written Opinion issued in corresponding PCT Application No. PCT/US2023/027251, mailed Nov. 7, 2023.

* cited by examiner

FLUID ENERGIZED METAL-TO-METAL SEAL WITH RETRIEVAL CAPABILITIES

BACKGROUND

Field of Invention

This invention relates in general to sealing between tubulars in a wellbore and more particularly to removable tubing and casing hanger seals.

Description of the Prior Art

The present technology relates to tubing and casing hangers used in wellbores for oil and gas extraction. A typical wellbore includes tubing and casing that can be suspended inside the wellbore for efficient fluid extraction. The tubing and casing can be supported by a hanger located at the surface of the wellbore. The hanger can suspend the tubing and casing in the wellbore and provide support for different fluid extraction operations. The hanger can attach just below the head of the tubing or casing to provide this support.

The hanger can also be used to seal the annular space between the tubing or casing being supported and the housing. The seals that can be used typically require mechanical force to energize the seal. Once in place, these seals can be difficult to disengage and can damage the housing and hanger upon being removed from the wellbore due to the amount of mechanical sealing force used.

SUMMARY

One embodiment of the present technology provides for a hanger sealing system including a flow passage connected to an annular space above the sealing system, at least one seal chamber connected to the flow passage, and a metal surface which encapsulates the seal chamber. The at least one seal chamber can expand when pressurized.

In other embodiments, there can be a check valve positioned between the flow passage and at least one seal chamber. The check valve can be oriented to allow fluid into the at least one seal chamber while preventing fluid flow out of the at least one seal chamber.

In some embodiments, a surface seal can be provided on the metal surface. In alternative embodiments, an external seal can be provided around the circumference of the housing.

An external stinger can be provided in other embodiments. The external stinger can be positioned within the housing of the annular space and can be moveable to be able to pierce the metal surface and at least one seal chamber.

In some embodiments, the sealing system can have at least one outer ridge on the metal surface. The outer ridge can extend radially outward away from the centerline of the hanger seal. The outer ridge can sealingly engage the housing when energized. Alternatively, the sealing system can have at least one inner ridge on the metal surface. The inner ridge can extend radially inward toward the centerline of the hanger seal. The inner ridge can sealingly engage the hanger when energized.

A second embodiment of the present technology provides for a hanger sealing system with a flow passage, at least one seal chamber fluidly connected to the flow passage, and a metal surface encapsulating the at least one seal chamber. There can also be tubing running from an external pressure source to the flow passage.

In other embodiments, there can be a check valve positioned between the flow passage and the external pressure source. The check valve can be oriented to allow fluid into the at least one seal chamber while preventing fluid flow out of the at least one seal chamber.

An external stinger can be provided in other embodiments. The external stinger can be positioned within the housing of the annular space and can be moveable to be able to pierce the metal surface and at least one seal chamber. In another embodiment, there can be a connector for connecting the tubing to the flow passage.

In some embodiments, the sealing system can have at least one outer ridge on the metal surface. The outer ridge can extend radially outward away from the centerline of the hanger seal. The outer ridge can sealingly engage the housing when energized. Alternatively, the sealing system can have at least one inner ridge on the metal surface. The inner ridge can extend radially inward away from the centerline of the hanger seal. The inner ridge can sealingly engage the hanger when energized.

Another embodiment provides for a method of sealing an annular space by positioning a hanger within the annular space, pressurizing the hanger seal, expanding the seal chamber of the hanger seal, and sealingly engaging a metal surface of the hanger seal.

In some embodiments the annular space above the hanger seal can also be pressurized. In other embodiments, the hanger seal can be pressurized with an external pressure source connected with tubing.

At least one outer ridge on the metal surface can be provided in some embodiments. This outer ridge can sealingly engage the housing of the annular space. In other embodiments, at least one inner ridge can be provided on the metal surface. The inner ridge can sealingly engage with the hanger.

In other embodiments the method can further include containing the pressure within the seal chamber with a check valve. In some embodiments, after pressuring the annular space above the hanger seal, pressure can be stopped from bypassing the seal by providing an external seal or surface seal between the hanger and the housing.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

Figure 1:
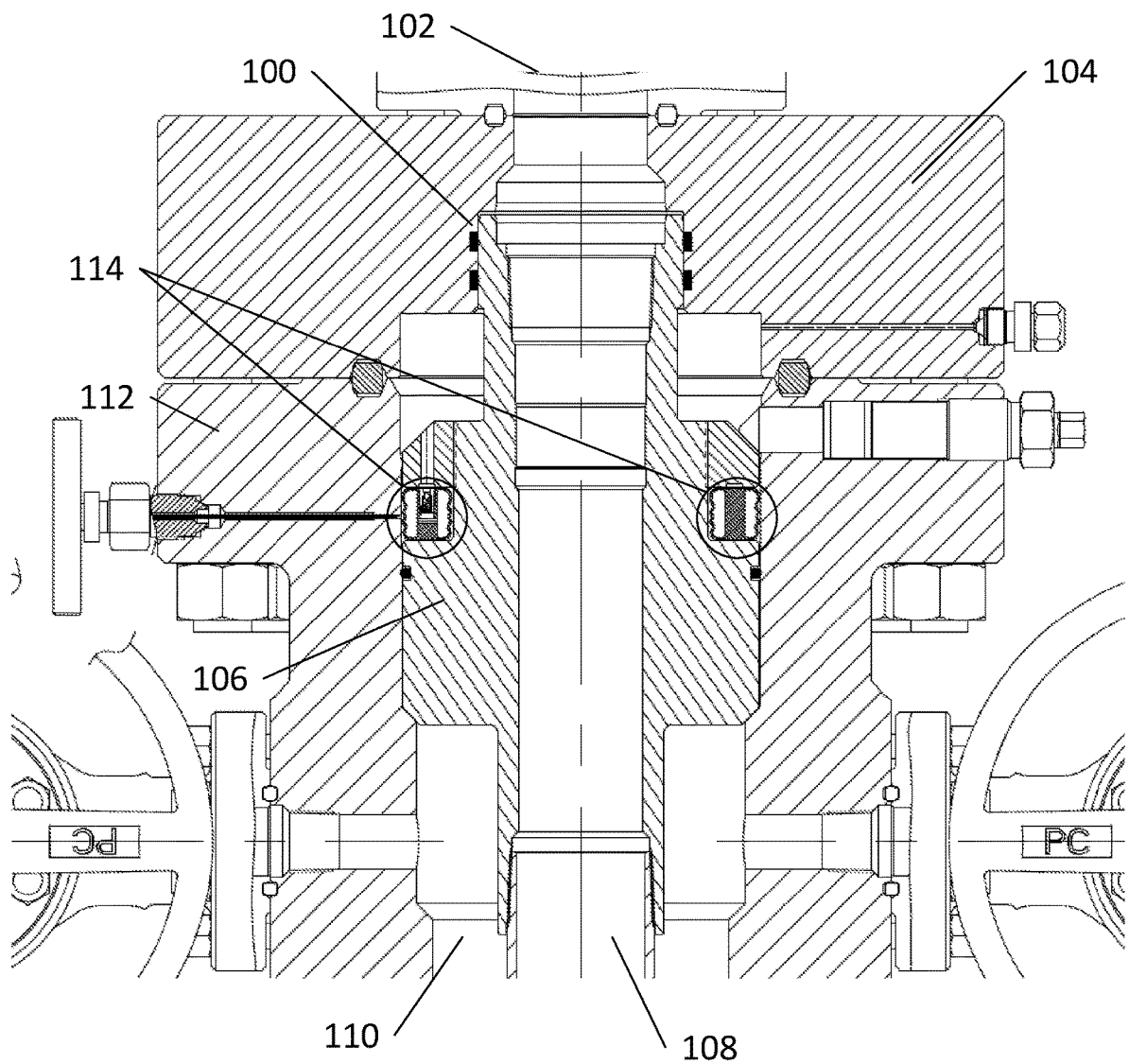
FIG. 1 is a cutaway schematic view of a tubing hanger and hanger seal according to the present technology.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The invention, however, is not intended to be limited to the specific terms used, and it is to be understood that each specific term can include equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment," "an embodiment," "certain embodiments," or "other embodiments" of the present invention are not intended to be interpreted as excluding the existence of additional embodiments that also incorporate the recited features. Furthermore, reference to terms such as "above," "below," "upper," "lower," "side," "front," "back," or other terms regarding orientation are made with reference to the illustrated embodiments and are not intended to be limiting or exclude other orientations.

The present technology provides for a metal-to-metal hanger seal that is inserted into an annular space in a depressurized state. The seal can then be pressurized to provide sealing contact at the housing and hanger. The seal can be depressurized by releasing the pressure in the seal, allowing for the retrieval of the seal from the annular space when desired. Depressurizing the seal prior to removal can result in less damage to the housing and hanger during the removal process of the seal.

FIG. 1 is an embodiment of a hanger system 100 according to the present technology. The tree 102 can connect to a tubing bonnet 104. The tree 102 can include an appropriate number of hydraulic connections for operations and maintenance of the equipment. The tree 102 can also connect to the tubing hanger 106 with associated tubing bore 108. The tubing hanger 106 can sit within an annular space 110 between the tubing bore 108 and the wellhead housing 112. The tubing hanger 106 can be used to suspend and support the tubing bore 108 within the annular space 110. The wellhead housing 112 can be a casing, tubular, or any other suitable surface.

A hanger seal 114 can seal between the wellhead housing 112 and tubing hanger 106. The hanger seal 114 can be used to prevent pressure in the annular space 110 below the tubing hanger 106 from reaching the tubing bonnet 104 and tree 102. The hanger seal 114 can run along the circumference of the tubing hanger 106 to seal with the wellhead housing 112.

The tubing hanger 106 can also be a casing hanger. In this embodiment the tubing bore 108 can be casing that would be suspended by the casing hanger. The hanger seal 114 could then be used to seal between a wellhead housing 112 and the casing hanger.

Figure 2A:
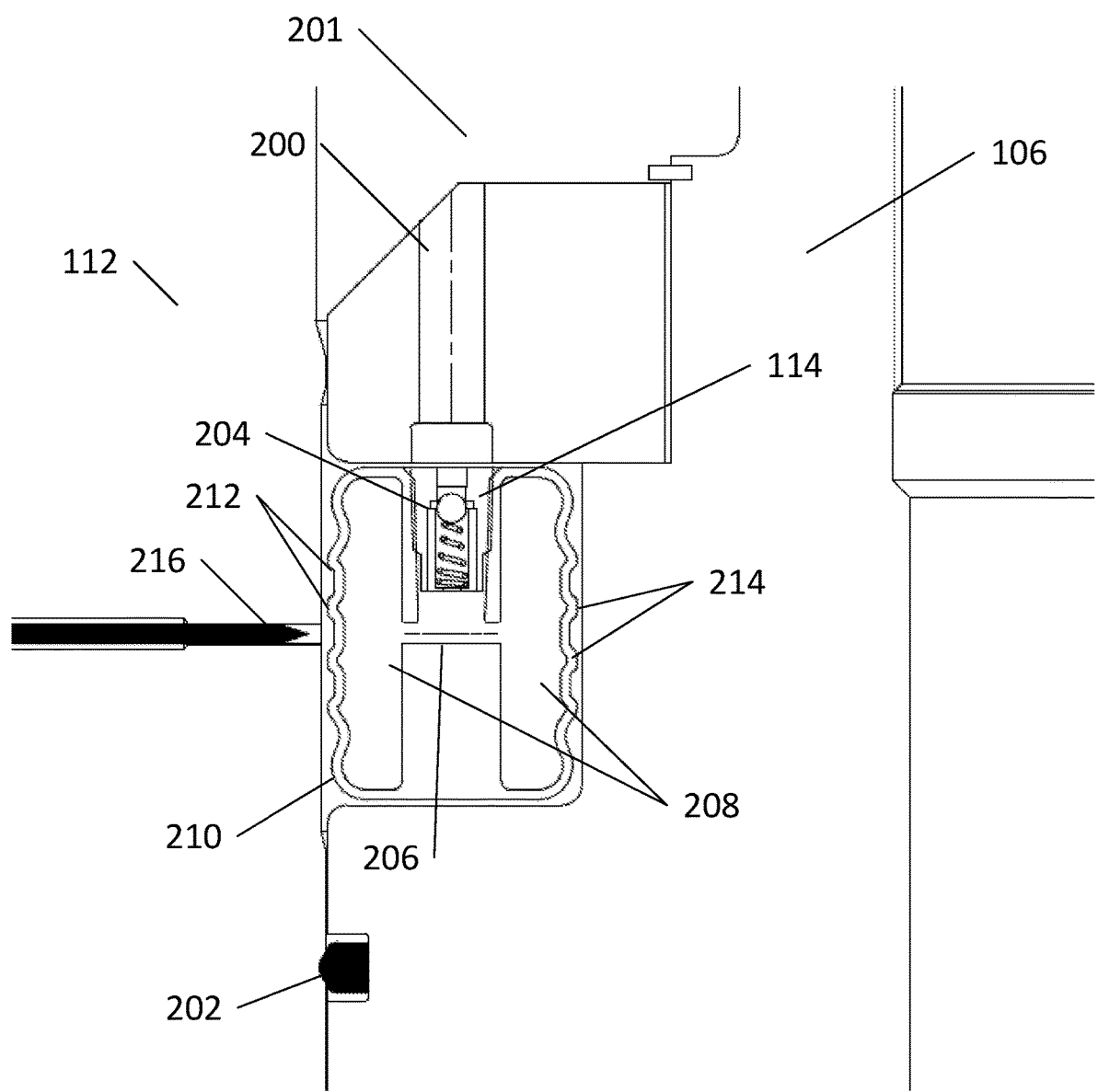
FIG. 2A is a cutaway schematic view showing one embodiment of a hanger seal according to the present technology.

FIG. 2A is an embodiment of hanger seal 114 according to the present technology. The hanger seal 114 can be openly communicable with an upper annular space 201 located between the hanger seal 114 and tubing bonnet 104 through flow passage 200. When the upper annular space 201 between the hanger seal 114 and tubing bonnet 104 is pressurized, the flow passage 200 can allow pressure into the hanger seal 114.

A seal 202 can prevent pressure in the upper annular space 201 from bypassing the flow passage 200 and continuing down into the wellbore during pressurization of the hanger seal 114. The seal 202 can be of an elastomer, a metallic material, or a non-metallic material. In some embodiments, the seal 202 can comprise graphene. The seal 202 can be positioned below the hanger seal 114 in some embodiments. In other embodiments, the seal 202 can be positioned above the hanger seal 114. Alternatively, there can be seals 202 positioned both above and below the hanger seal 114.

Downstream of the flow passage 200 there can be a check valve 204. The check valve 204 can be oriented such that pressure entering from the flow passage 200 can cause the check valve 204 to open allowing pressure to enter the hanger seal 114. The check valve 204 can also prevent pressure within the hanger seal 114 from exiting through the flow passage 200 by sealing off the flow passage 200 after the seal is pressurized. The check valve 204 can be integral within the hanger seal 114 or can be provided external to the hanger seal 114.

Downstream of the check valve 204 there can be a connection passage 206 that can connect the seal chambers 208 to the check valve 204. Pressure entering the seal through the check valve 204 can continue through the connection passage 206 and into the seal chambers 208. There can be at least one seal chamber 208 within the hanger seal 114. The seal chambers 208 can accumulate pressure within the hanger seal 114. As pressure increases in the seal chambers 208, the seal chambers 208 can expand and deform from a first position to a final position. The expanding seal chambers 208 can cause deformation of the metal surface 210 of the hanger seal 114.

The metal surface 210 can encapsulate the seal chambers 208 such that expansion of the seal chamber 208 can result in expansion of the metal surface 210. The metal surface 210 can include at least one outer ridge 212 and at least one inner ridge 214. The at least one outer ridge 212 can be positioned on the metal surface 210 extending radially outward away from the centerline of the tubing hanger 106 and in the direction of the wellhead housing 112. The at least one inner ridge 214 can be positioned on the metal surface 210 extending radially inward towards the centerline of the tubing hanger 106.

The metal surface 210 can deform due to expansion of the seal chamber 208. In some embodiments, the metal surface 210 can elastically deform. This can result such that the metal surface 210 can return to an original position when the pressure within the seal chamber 208 is removed. In other embodiments, the metal surface 210 can plastically deform. This can result such that the metal surface 210 does not return to an original position once pressure is removed from the seal chamber 208.

The seal chambers 208 can expand to a final position as pressure accumulates. In the final position the metal surface 210 can sealingly engage with the wellhead housing 112 at outer ridges 212 on the metal surface 210 due to the expansion of the seal chambers 208. The expansion of the seal chamber 208 can also sealingly engage the inner ridges 214 on the metal surface 210 of the hanger seal 114 and the tubing hanger 106. As a result of pressurizing the seal chamber 208, the hanger seal 114 can seal the upper annular space 201.

After initial pressurization, the seal chambers 208 can remain pressurized due to the check valve 204 preventing pressure from escaping the system. This can provide sealing contact at the hanger seal 114 while the seal is engaged in the hanger system 100. When it is desired to depressurize the system and break the seal, a stinger 216 can be used to pierce the metal surface 210 and seal chamber 208. The stinger 216 can be located inside the wellhead housing 112 of the annular space 110. The stinger 216 can be moved with a mechanical force to perform the required piercing of the metal surface 210 and seal chamber 208.

This action can create a hole in the metal surface 210 and seal chamber 208 to allow the system to depressurize into the annular space 110. In an alternate embodiment, the seal chamber 208 can depressurize through the bore of the stinger 216. Depressurization of the system can result in the seal chambers 208 returning to a first position. As the seal chambers 208 return to the first position, the seal chambers 208 can no longer exert a force on the metal surface 210. This can result such that the elastic metal surface 210 breaks sealing contact between the outer ridges 212 and the wellhead housing 112. This also breaks sealing contact between the inner ridges 214 and the tubing hanger 106. This can allow for removal of the tubing hanger 106 with reduced damage to the wellhead housing 112. Plastically deformed metal surfaces 210 may not break sealing contact, even when pressure is released.

In alternate embodiments, the stinger 216 can be hollow. This can allow for the flow of fluid into or out of the stinger. In this embodiment, the stinger 216 can be used to transfer a sealant into the seal chamber 208. In this embodiment, the stinger 216 can puncture the seal chamber 208 to allow for the sealant to be transferred directly to the seal chamber 208. This can be used in instances where the seal chamber 208 leaks pressure such that the sealant can reseal the seal chamber 208 and prevent an elastically deforming metal surface 210 from breaking sealing contact.

Figure 2B:
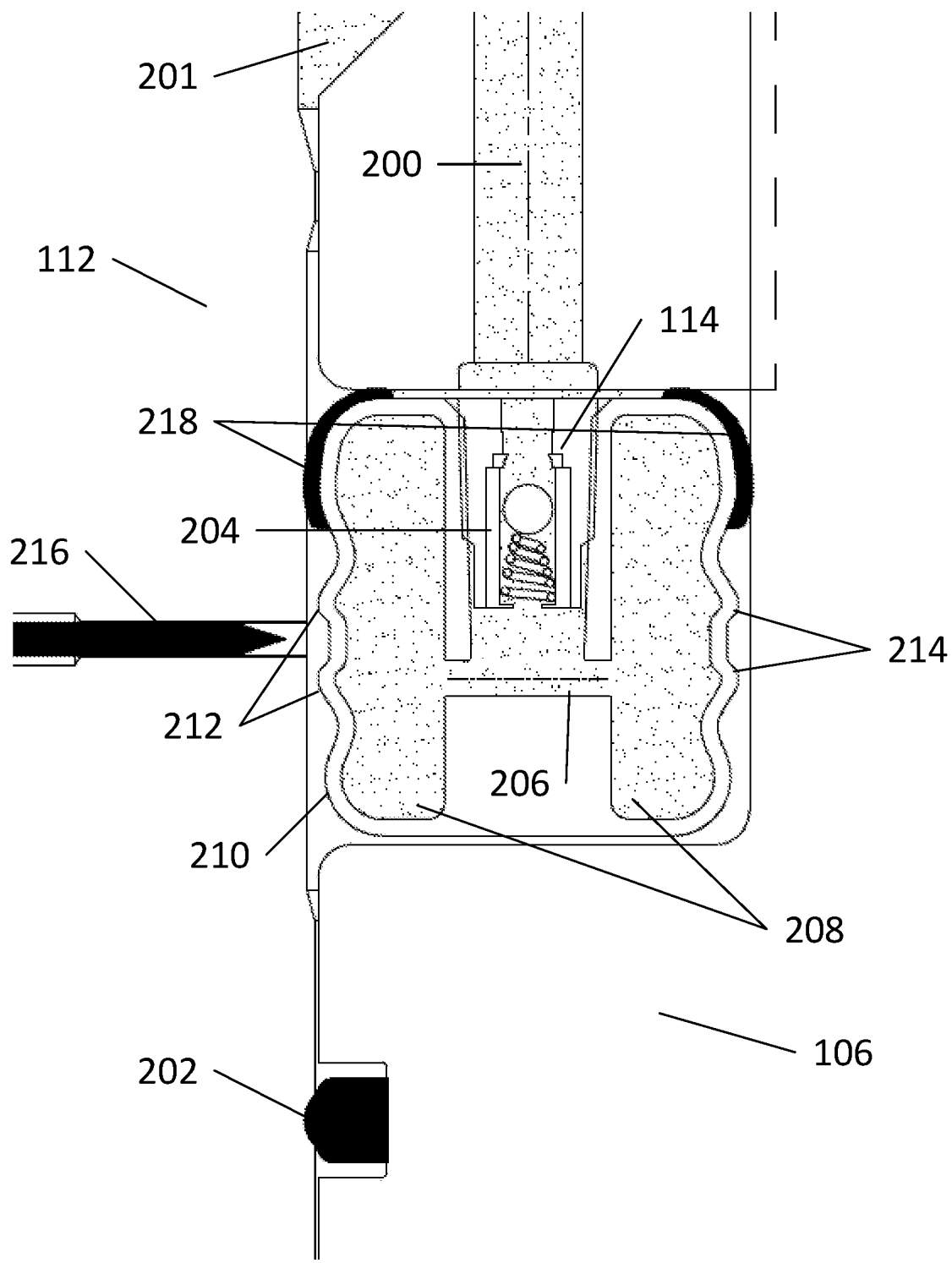
FIG. 2B is a cutaway schematic view showing another embodiment of a hanger seal according to the present technology.

FIG. 2B is an alternative embodiment of hanger seal 114 according to the present technology. Here, the metal surface 210 can include surface seals 218. The surface seals 218 can sealingly engage the wellhead housing 112 and tubing hanger 106 prior to pressurization of the hanger seal 114. The surface seals 218 can accomplish a similar function as the seal 202 by preventing pressure in the upper annular space 201 from bypassing the flow passage 200 and continuing into the wellbore. The surface seals 218 can comprise an elastomer, a metallic material, or a non-metallic material. In some embodiments, the surface seal 218 can comprise graphene. In this embodiment, the surface seals 218 can provide sufficient sealing for pressurizing the hanger seal 114 while engagement of the outer ridges 212 and inner ridges 214 after pressurization can provide sufficient sealing of the hanger seal 114 for standard well site operations. The surface seal 218 can be positioned at the top of the metal surface 210, bottom of the metal surface 210, or at any other appropriate location.

Additionally, this embodiment can provide for a different number of outer and inner ridges 212 and 214. The hanger seal 114 can have any number of appropriate outer and inner ridges 214 as necessary for sealing.

In some embodiments, the seal may be configured to seal a single surface. In some embodiments, the seal can be provided with only an outer sealing surface with outer ridges 212. In this configuration, the seal may only seal against the wellhead housing 112 when the seal is engaged. In another configuration, the seal can be provided with only an inner sealing surface with inner ridges 214. In this configuration, the seal may only seal against the tubing hanger 106.

Figure 2C:
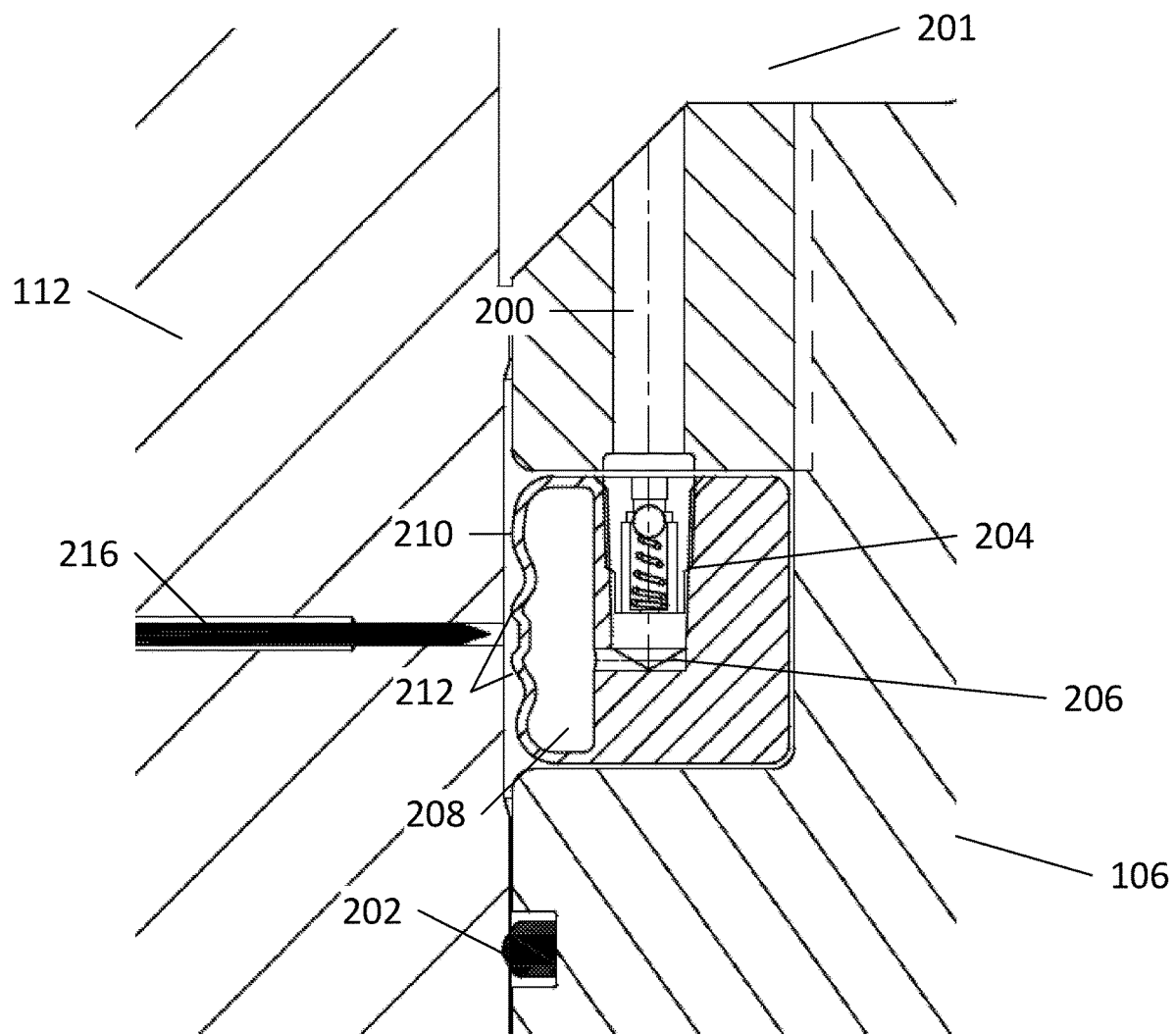
FIG. 2C is a cutaway schematic view showing an embodiment of a single surface hanger seal according to the present technology.

FIG. 2C provides for an embodiment with a single seal chamber 208 for sealingly engaging the wellhead housing. In this embodiment, a single seal chamber 208 can be provided to receive pressure external to the seal. This can result in sealing contact of the outer ridges 212 against the wellhead housing 112 without sealing against the tubing hanger 106. This can be useful to seal specific ports or holes within the wellhead housing 112 or if sealing against the tubing hanger 106 is already provided in a separate location.

Figure 2D:
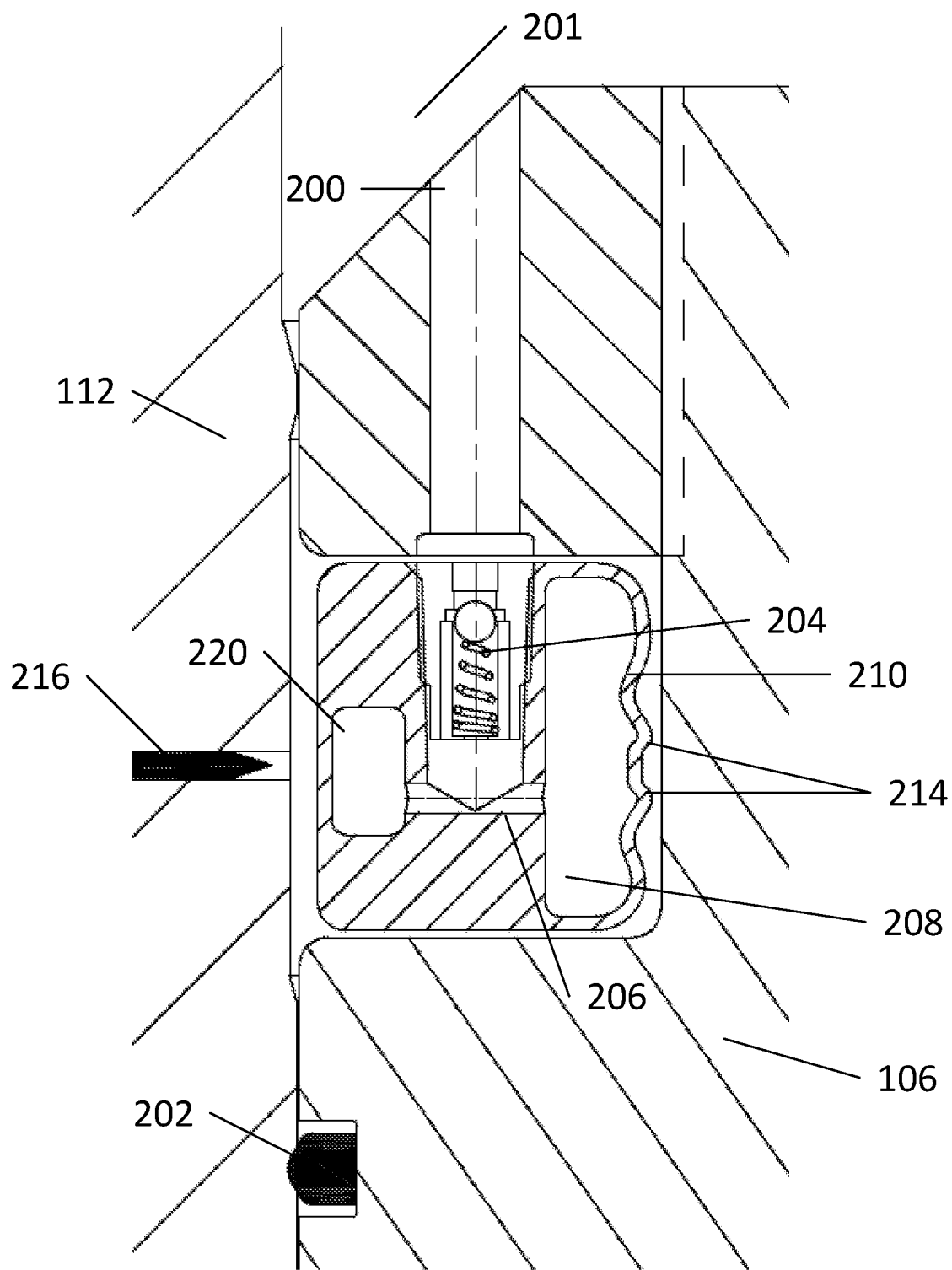
FIG. 2D is a cutaway schematic view showing another embodiment of a single surface hanger seal according to the present technology

FIG. 2D provides for an alternate embodiment with a single seal chamber 208 for sealingly engaging the tubing hanger 106. Similar to the embodiment shown in FIG. 2C, a single seal chamber 208 can be provided to receive pressure external to the seal. This can result in sealing contact of the inner ridges 214 against the tubing hanger 106 without sealing against the wellhead housing 112. This configuration can also provide for a stinger target 220. The stinger target can be a non-deformable location that can be punctured by the stinger 216. This can allow for pressure release of the seal system by puncturing the stinger target 220 with the stinger 216 to release pressure from the seal chamber 208 on the opposite side of the seal.

Figure 3:
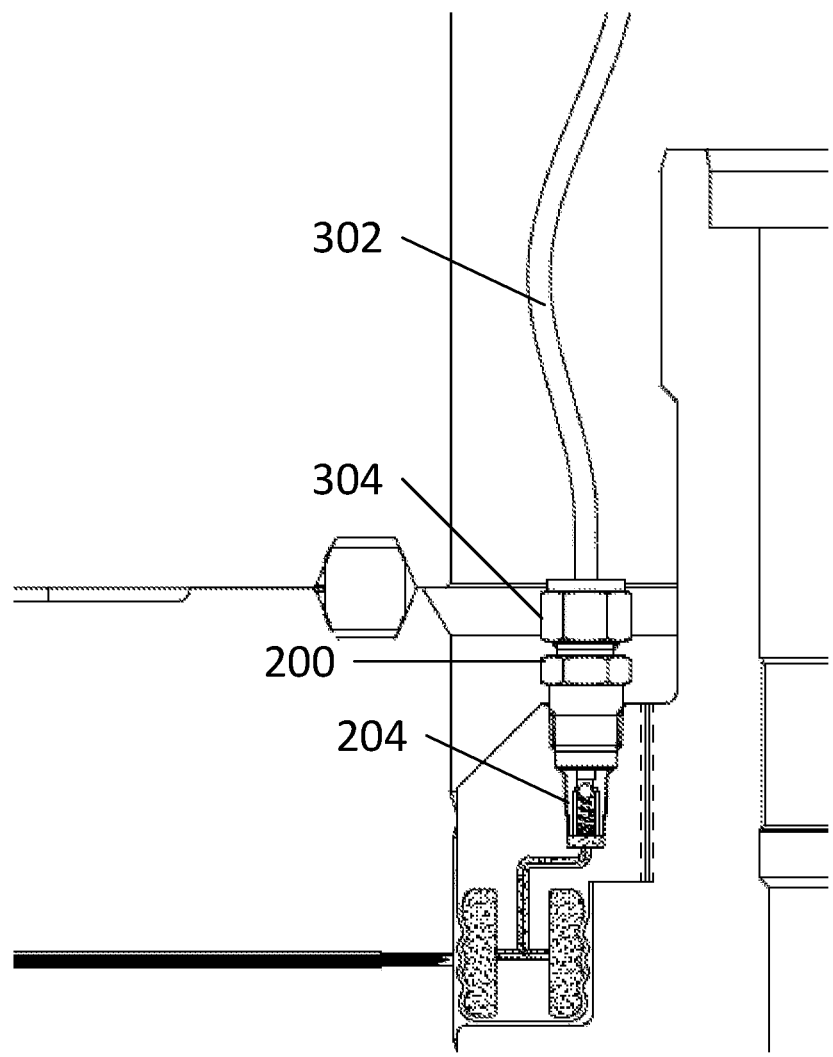
FIG. 3 is a cutaway schematic view showing an embodiment of a hanger seal with external pressurization according to the present technology.

FIG. 3 provides for an alternative embodiment of the technology with external pressurization. In this embodiment, the check valve 204 can be provided integral to the hanger seal 114. Alternatively, the check valve 204 can be positioned separate from the hanger seal 114. Additionally, there can be tubing 302 running from the flow passage 200 to a location external to the hanger system 100.

A connector 304 can be provided for connecting the tubing 302 with the hanger seal 114. The connector 304 can be a threaded ring, retainer ring, snap ring, threaded fastener, or any other appropriate type of connection.

In this configuration, a remote pressure source can be provided for connecting to the tubing 302. The remote pressure source can be a compressor, pressurized bottle, or any other appropriate source of pressure. The remote pressure source can be used to pressurize the hanger seal 114 through the check valve 204, tubing 302, and connector 304. This can allow for pressurization of the hanger seal 114 without pressurizing the annular space 110. In this configuration, the separate seal 202 and surface seals 218 may not be required as the flow passage 200 may not be openly communicable with the annular space 110.

The external pressurization shown in FIG. 3 can be used with any of the seal configurations shown in FIGS. 2A, 2B, 2C, and 2D.

Figure 4:
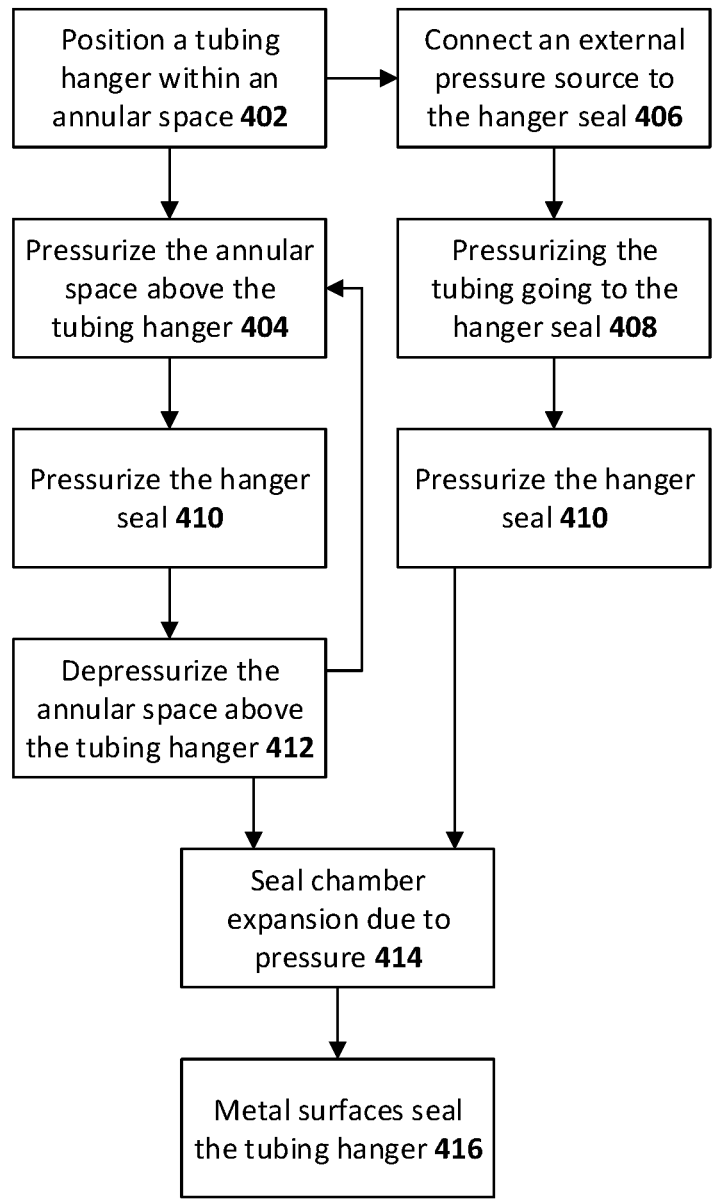
FIG. 4 is a flow diagram showing the steps to activate a hanger seal according to an embodiment of the present technology.

FIG. 4 provides a procedure for sealing an annular space with a hanger according to the present technology. The hanger can first be positioned within the annular space in step 402. The next step depends on whether there is an external pressure source as shown in FIG. 3 or if the seal is pressurized from the annular space as in FIGS. 2A-2D.

Without an external pressure source, the sequence can continue to step 404. Here, the annular space above the tubing hanger can be pressurized. However, with an external pressure source, the sequence continues to step 406 where the pressure source can be connected to the hanger seal. The pressure source can then be opened to pressurize the tubing in step 408.

In step 410, the hanger seal can then be pressurized by either of the two pressure sources depending on the configuration. In step 412, the annular space above the tubing hanger can be depressurized to allow expansion of the seal chamber in step 414. The method of pressurizing and depressurizing the annular space above the tubing hanger can be repeated as necessary. The expansion of the seal chambers can result in sealing contact between the ridges of the metal surfaces and both the surface or surfaces to be sealed in step 416.

Figure 5:
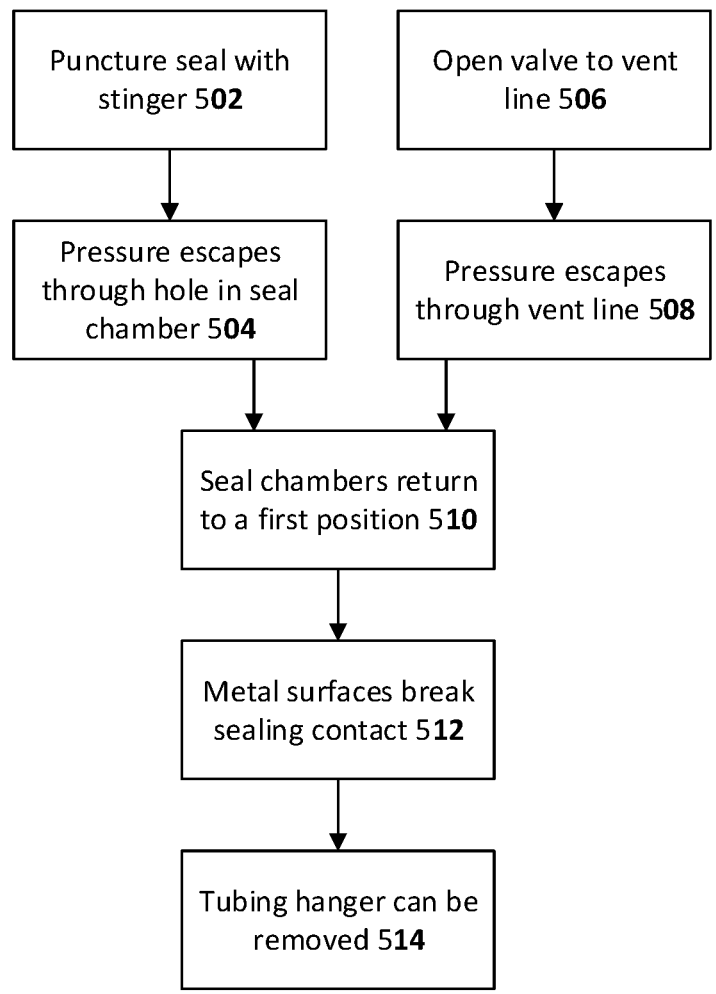
FIG. 5 is a flow diagram showing the steps to deactivate a hanger seal according to an embodiment of the present technology.

FIG. 5 provides for a procedure for breaking the seal of the hanger according to the present technology. Again, the method depends on whether the seal has an external pressure vent or a stinger of FIG. 2A. Without an external pressure vent, the seal can be initially punctured with a stinger in step 502. This can allow pressure within the seal to escape through the puncture hole in step 504.

If the seal does have an external pressure vent, the vent can be opened in step 506. Pressure can then bleed through that vent in step 508. Alternatively, the seal can be punctured with the stinger to allow pressure to bleed off through the hole in steps 502 and 504 even if the external pressure vent is in place.

As a result of the pressure bleed off, the seal chamber can return to a first position within the seal at step 510. Without the pressure from the seal chamber, the metal surface of the seal can break sealing contact with the wellhead housing of the annular space and hanger at step 512. This breaks the seal of the hanger. Once the seal is broken, the hanger can be removed in step 514.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

That claimed is:

1. A hanger sealing system comprising:
    a flow passage fluidly connected to an annular space above a hanger;
    at least one seal chamber fluidly connected to the flow passage;
    a metal surface encapsulating the at least one seal chamber; and
    a check valve integral with or positioned adjacent to the at least one seal chamber and positioned between the flow passage and the at least one seal chamber oriented to prevent fluid flow out of the at least one seal chamber;
    wherein the metal surface expands when pressurized by fluid from the flow passage.

2. The hanger sealing system of claim 1 further comprising one or more surface seals on the metal surface.

3. The hanger sealing system of claim 1 further comprising:
    a housing substantially enclosing the hanger sealing system;
    an external seal positioned around the circumference of the housing.

4. The hanger seal of claim 1 further comprising:
    an external stinger positioned within a housing and adjacent to the at least one seal chamber wherein the external stinger is moveable in order to pierce the metal surface and at least one seal chamber of the hanger sealing system.

5. The hanger seal of claim 1 further comprising:
    at least one outer ridge of the metal surface extending radially outward away from a centerline of the hanger seal such that when the seal is energized, the at least one outer ridge sealingly engages a housing.

6. The hanger sealing system of claim 1 further comprising:
    at least one inner ridge of the metal surface extending radially inward towards the centerline of the hanger seal such that when the seal is energized the at least one inner ridge sealingly engages the hanger.

7. A hanger sealing system comprising:
    a flow passage;
    at least one seal chamber fluidly connected to the flow passage;
    a metal surface encapsulating the at least one seal chamber;
    a check valve integral with or positioned adjacent to the at least one seal chamber and positioned between the flow passage and the at least one seal chamber oriented to prevent fluid flow of the fluid out of the at least one seal chamber; and
    tubing running from an external pressure source to the flow passage the at least one seal chamber being pressured by such pressure source.

8. The hanger sealing system of claim 7 further comprising:
    a housing substantially enclosing the hanger sealing system;
    an external stinger positioned within the housing and adjacent to the at least one seal chamber wherein the external stinger is moveable in order to pierce the metal surface and at least one seal chamber of the hanger sealing system.

9. The hanger sealing system of claim 7 further comprising:
    a connector for connecting the tubing to the flow passage.

10. The hanger seal of claim 7 wherein the at least one outer ridge further comprises:
    at least one outer ridge of the metal surface extending radially outward away from a centerline of the hanger seal such that when the seal is energized, the at least one outer ridge sealingly engages a housing.

11. The hanger sealing system of claim 7 wherein the at least one ridge further comprises:
    at least one inner ridge of the metal surface extending radially inward towards the centerline of the seal so that when the seal is energized the at least one inner ridge sealingly engages a hanger.

12. A method of sealing an annular space, the method comprising:
    positioning a hanger within an annular space;
    pressurizing a hanger seal of the hanger;
    expanding a seal chamber of the hanger seal by such pressure;
    sealingly engaging a metal surface of the hanger seal upon such expansion; and
    containing such pressure within the seal chamber with a check valve integral with or positioned adjacent to the seal chamber.

13. The method of claim 12 wherein pressurizing the hanger seal further comprises:
   pressurizing the annular space above the hanger seal.

14. The method of claim 13 wherein pressurizing the annular space above the hanger seal further comprises:
   preventing pressure from entering the annular space below the hanger seal with an external seal or surface seal sealing between a hanger and a housing.

15. The method of claim 12 wherein pressurizing the hanger seal further comprises:
   opening an external pressure source connected to the hanger seal with tubing.

16. The method of claim 12 further comprising:
   providing at least one outer ridge on the metal surface of the hanger seal; and
   sealingly engaging the at least one outer ridge with a housing of the annular space.

17. The method of claim 12 further comprising:
   providing at least one inner ridge on the metal surface of the hanger seal; and
   sealingly engaging the at least one inner ridge with the hanger.

\* \* \* \* \*